(12) United States Patent
Twining et al.

(10) Patent No.: US 10,912,411 B1
(45) Date of Patent: Feb. 9, 2021

(54) ROLLER COOKER

(71) Applicants: Travis Twining, Santa Barbara, CA (US); John Stump, Santa Barbara, CA (US)

(72) Inventors: Travis Twining, Santa Barbara, CA (US); John Stump, Santa Barbara, CA (US)

( * ) Notice: Subject to any disclaimer, the term of this patent is extended or adjusted under 35 U.S.C. 154(b) by 0 days.

(21) Appl. No.: 16/592,392

(22) Filed: Oct. 3, 2019

(51) Int. Cl.
*A47J 36/32* (2006.01)
*A47J 27/00* (2006.01)
*A47J 36/36* (2006.01)
*A47J 36/06* (2006.01)

(52) U.S. Cl.
CPC .............. *A47J 36/32* (2013.01); *A47J 27/002* (2013.01); *A47J 27/004* (2013.01); *A47J 36/06* (2013.01); *A47J 36/36* (2013.01)

(58) Field of Classification Search
CPC .......... A47J 36/32; A47J 27/004; A47J 36/36; A47J 27/002; A47J 36/06
USPC ......................................................... 99/331
See application file for complete search history.

(56) References Cited

U.S. PATENT DOCUMENTS

| | | | | |
|---|---|---|---|---|
| 4,968,515 A | * | 11/1990 | Burkett | A47J 36/32 426/233 |
| 6,097,016 A | * | 8/2000 | Hirata | H05B 6/6435 219/720 |
| 2015/0204546 A1 | * | 7/2015 | Onnermark | A47J 37/047 219/400 |
| 2018/0177339 A1 | * | 6/2018 | Hua | A47J 37/106 |

* cited by examiner

*Primary Examiner* — Dana Ross
*Assistant Examiner* — James F Sims, III
(74) *Attorney, Agent, or Firm* — Patent Service Associates, Inc.; Lyman Smith (57) ABSTRACT

A roller cooking apparatus evenly cooks food while requiring minimal, if any, user intervention. The roller cooking apparatus includes a removable cooking chamber that can be rotated while heat is applied to cook food placed therein. The roller cooking apparatus can include a plurality of pre-programmed cooking modes and may also be manually programmed to set any of a plurality of parameters. These parameters can include cooking temperature, rotation speed, chamber angle, steam retention or exhaust, cooking time and the like. The design of the inner chamber may vary, including solid walled chambers, ventilated chambers, chambers with inner paddles, or the like. The resulting roller cooker can cook a variety of foods in a single step and may even include a feature of automatically opening its lid to deliver cooked food to a serving dish, for example.

15 Claims, 12 Drawing Sheets

ROLLER COOKER

BACKGROUND OF THE INVENTION

1. Field of the Invention

One or more embodiments of the invention relates generally to cooking devices. More particularly, the invention relates to a cooking apparatus having a cooking chamber that can rotate either continuously or intermittently during cooking of contents therein.

2. Description of Prior Art and Related Information

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Conventional cooking techniques include baking, frying, steaming, or the like. However, each of these methods have drawbacks. For example, when baking or frying, a user is often required to turn the food to ensure even cooking. When steaming, the steam can move upward through the food and then exits a conventional steamer or condenses back into a water pool to be reheated. Food in a central region may steam at a slower rate as compared to food at the edges. Thus, conventional cooking techniques often require user intervention to ensure even cooking.

In view of the foregoing, there is a need for a cooking apparatus where a user may cook food evenly with minimal, if any, user intervention during cooking.

SUMMARY OF THE INVENTION

Embodiments of the present invention provide a device for cooking a food product comprising an inner cooking chamber having at least one open end; a cap removably placeable on the at least one open end; an outer housing receiving the inner cooking chamber therein; a motor operable to turn the inner cooking chamber relative to the outer housing; a lid disposed over the open end of the inner cooking chamber; and a heating element disposed adjacent to the inner cooking chamber.

Embodiments of the present invention further provide a device for cooking a food product comprising an inner cooking chamber having at least one open end; a cap removably placeable on the at least one open end; an outer housing receiving the inner cooking chamber therein; a motor operable to turn the inner cooking chamber relative to the outer housing; a lid disposed over the open end of the inner cooking chamber; an insulation layer disposed between the outer housing and the inner cooking chamber; an inner safety shield disposed between the inner cooking chamber and the outer housing; and a heating element disposed adjacent to the inner cooking chamber.

Embodiments of the present invention also provide a device for cooking a food product comprising an inner cooking chamber having at least one open end; a cap removably placeable on the at least one open end; an outer housing receiving the inner cooking chamber therein; a motor operable to turn the inner cooking chamber relative to the outer housing; a lid disposed over the open end of the inner cooking chamber; an insulation layer disposed between the outer housing and the inner cooking chamber; an inner safety shield disposed between the inner cooking chamber and the outer housing; a heating element disposed adjacent to the inner cooking chamber; and a control panel permitting the user to select a plurality of parameters for the cooking device wherein the plurality of parameters includes a cooking temperature, a cooking time and a rotation speed of the inner cooking chamber.

These and other features, aspects and advantages of the present invention will become better understood with reference to the following drawings, description and claims.

BRIEF DESCRIPTION OF THE DRAWINGS

Some embodiments of the present invention are illustrated as an example and are not limited by the figures of the accompanying drawings, in which like references may indicate similar elements.

Unless otherwise indicated illustrations in the figures are not necessarily drawn to scale.

The invention and its various embodiments can now be better understood by turning to the following detailed description wherein illustrated embodiments are described. It is to be expressly understood that the illustrated embodiments are set forth as examples and not by way of limitations on the invention as ultimately defined in the claims.

DETAILED DESCRIPTION OF THE PREFERRED EMBODIMENTS AND BEST MODE OF INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention, and is not intended to limit the invention to the specific embodiments illustrated by the figures or description below.

As is well known to those skilled in the art, many careful considerations and compromises typically must be made when designing for the optimal configuration of a commercial implementation of any system, and in particular, the embodiments of the present invention. A commercial implementation in accordance with the spirit and teachings of the present invention may be configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

Broadly, embodiments of the present invention provide a roller cooking apparatus for evenly cooking food while requiring minimal, if any, user intervention. The roller cooking apparatus includes a removable cooking chamber that can be rotated while heat is applied to cook food placed therein. The roller cooking apparatus can include a plurality of pre-programmed cooking modes and may also be manually programmed to set any of a plurality of parameters. These parameters can include cooking temperature, rotation speed, chamber angle, steam retention or exhaust, cooking time and the like. The design of the inner chamber may vary, including solid walled chambers, ventilated chambers, chambers with inner paddles, or the like. The paddles may be designed in various configurations, such as an involute curve for example. The resulting roller cooker can cook a variety of foods in a single step and may even include a feature of automatically opening its lid to deliver cooked food to a serving dish, for example.

Figure 1:
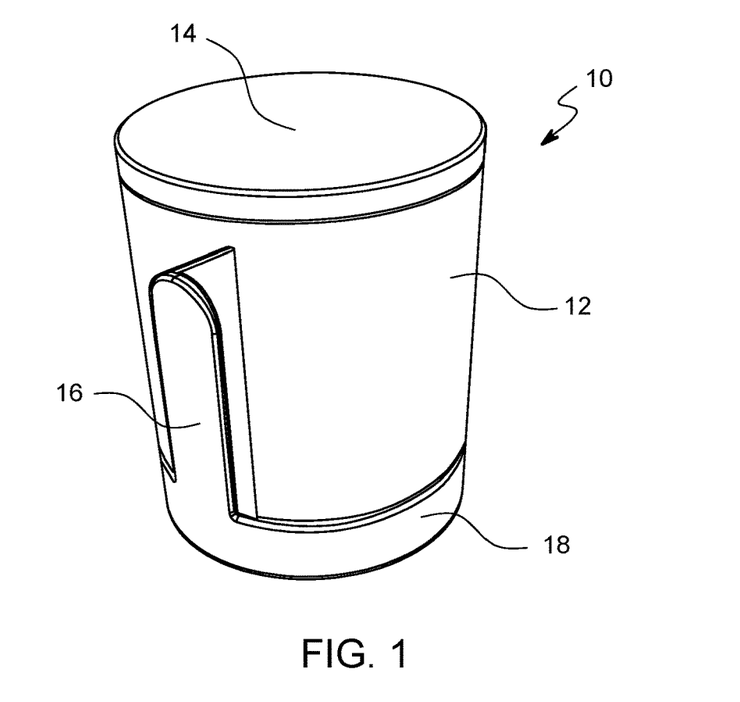
FIG. 1 is a perspective view of a roller cooker in an upright configuration according to an exemplary embodiment of the present invention.
Figure 2:
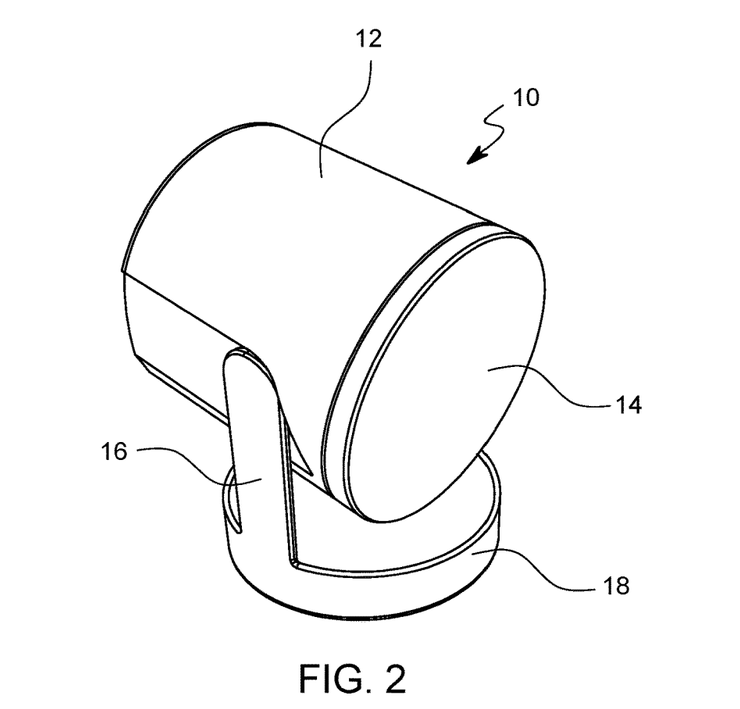
FIG. 2 is a perspective view of the roller cooker of FIG. 1 in an angled configuration.

Referring to FIGS. 1 and 2, a roller cooker 10 can include a cooking chamber 12 that is covered with a lid 14. The cooking chamber 12 is supported via legs 16 attached to a base 18. The cooking chamber 12 may pivot on the legs 16 to provide various angles for cook food disposed inside the cooking chamber 12. An internal cooking chamber, as discussed below, may rotate relative to the outside of the cooking chamber 12 to turn food placed there inside.

Figure 3:
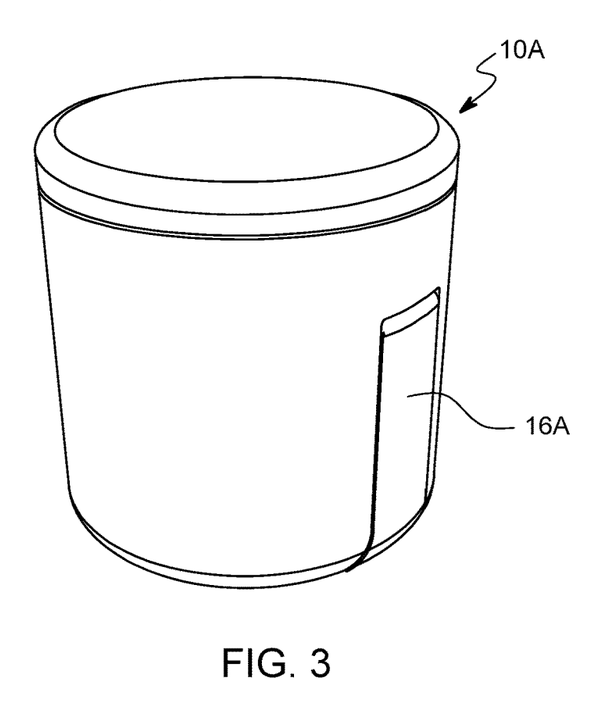
FIG. 3 is a perspective view of a roller cooker in an upright configuration according to an exemplary embodiment of the present invention.
Figure 4:
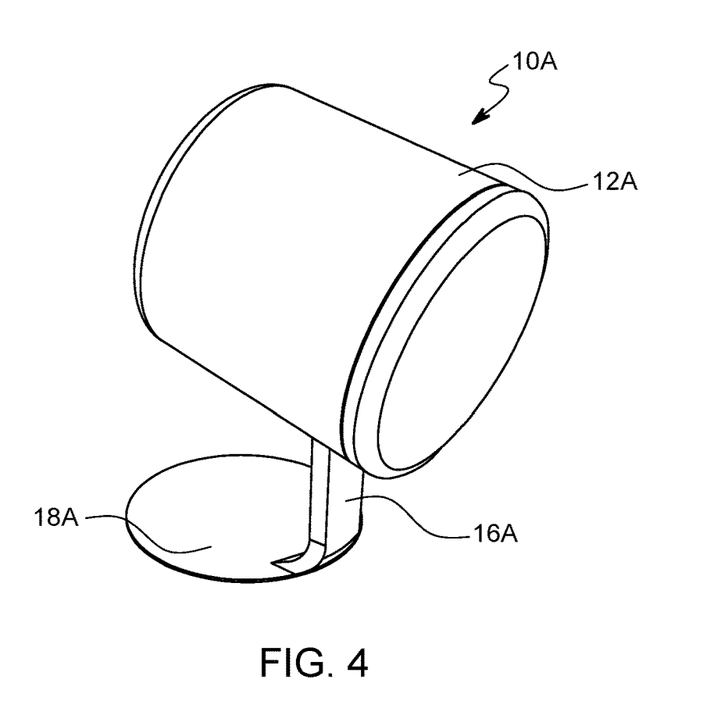
FIG. 4 is a perspective view of the roller cooker of FIG. 3 in an angled configuration.

Referring to FIGS. 3 and 4, a roller cooker 10A may be generally the same as the roller cooker 10, described above, except that a single leg 18A may extent from the base 18A to support the cooking chamber 12A. In this embodiment, the cooking chamber 12A may pivot on an axis that is tangential to the cooking chamber 12A.

Figure 5:
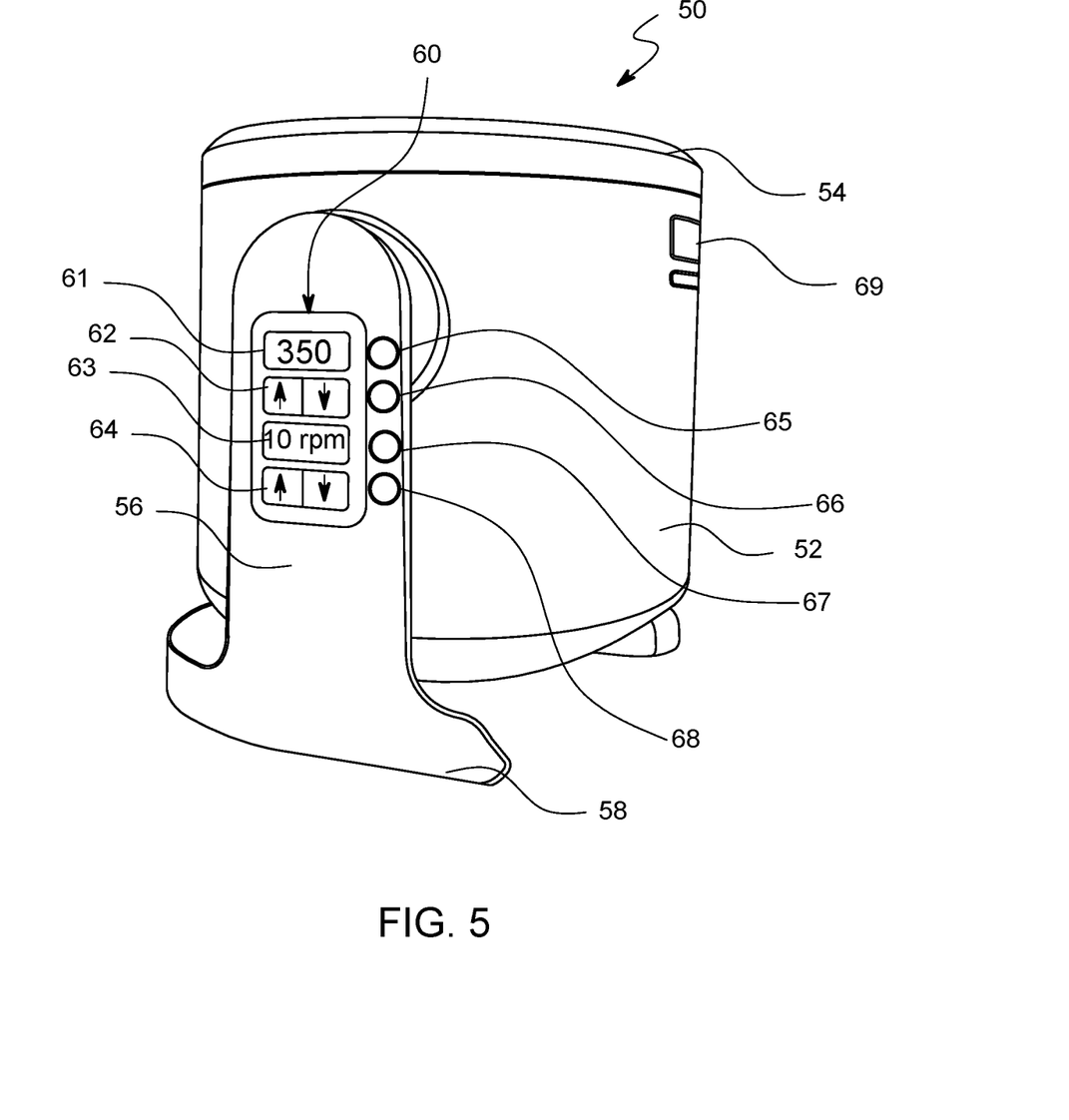
FIG. 5 is a perspective view of a roller cooker in an upright configuration according to an exemplary embodiment of the present invention.
Figure 6:
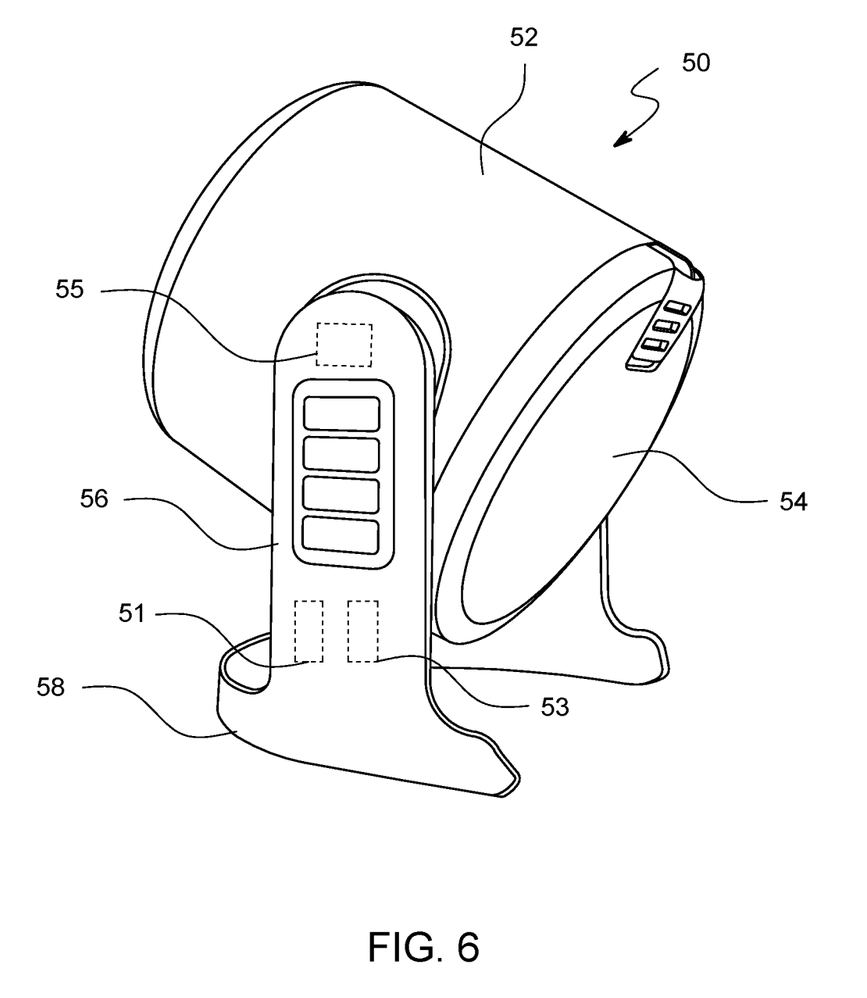
FIG. 6 is a perspective view of the roller cooker of FIG. 5.
Figure 7:
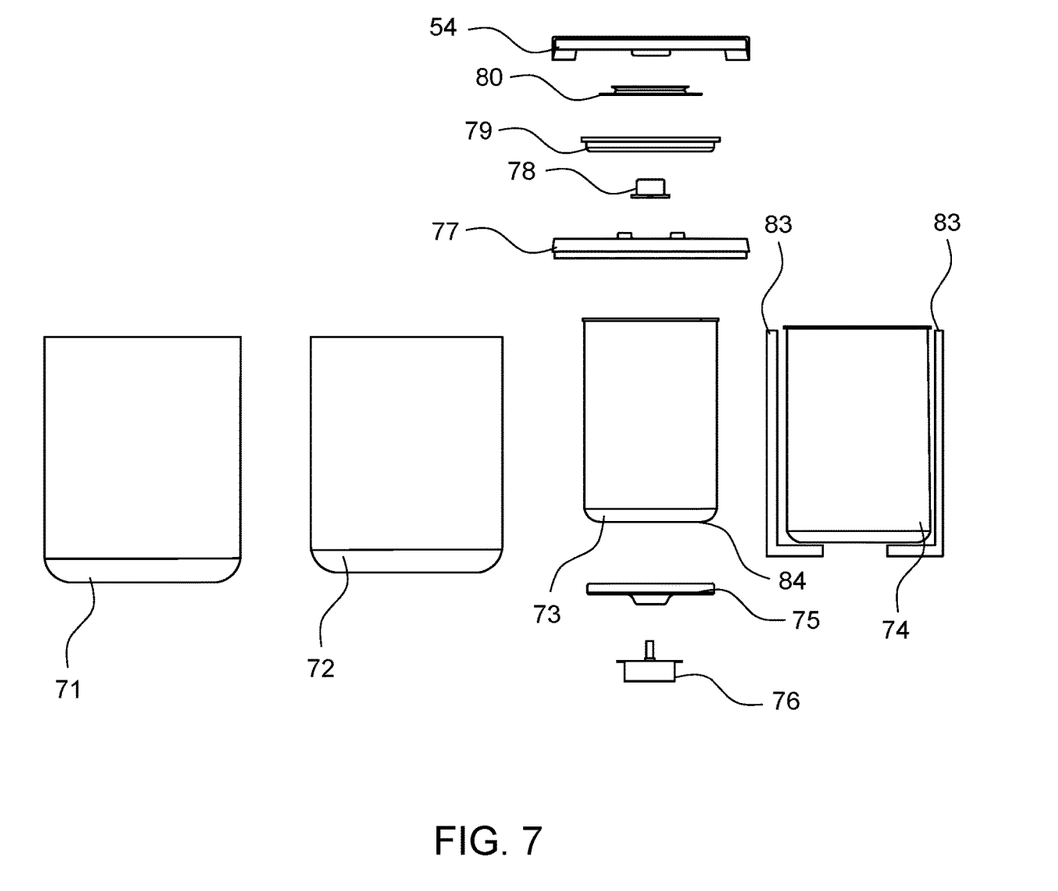
FIG. 7 is an exploded view of a roller cooker with its base removed for clarity.

Referring to FIGS. 5 through 7, a roller cooker 50, like those described above, can include a cooking chamber 52 covered with a lid 54. The cooking chamber 52 may be pivotably supported by legs 56 extending from a base 58.

Figure 8:
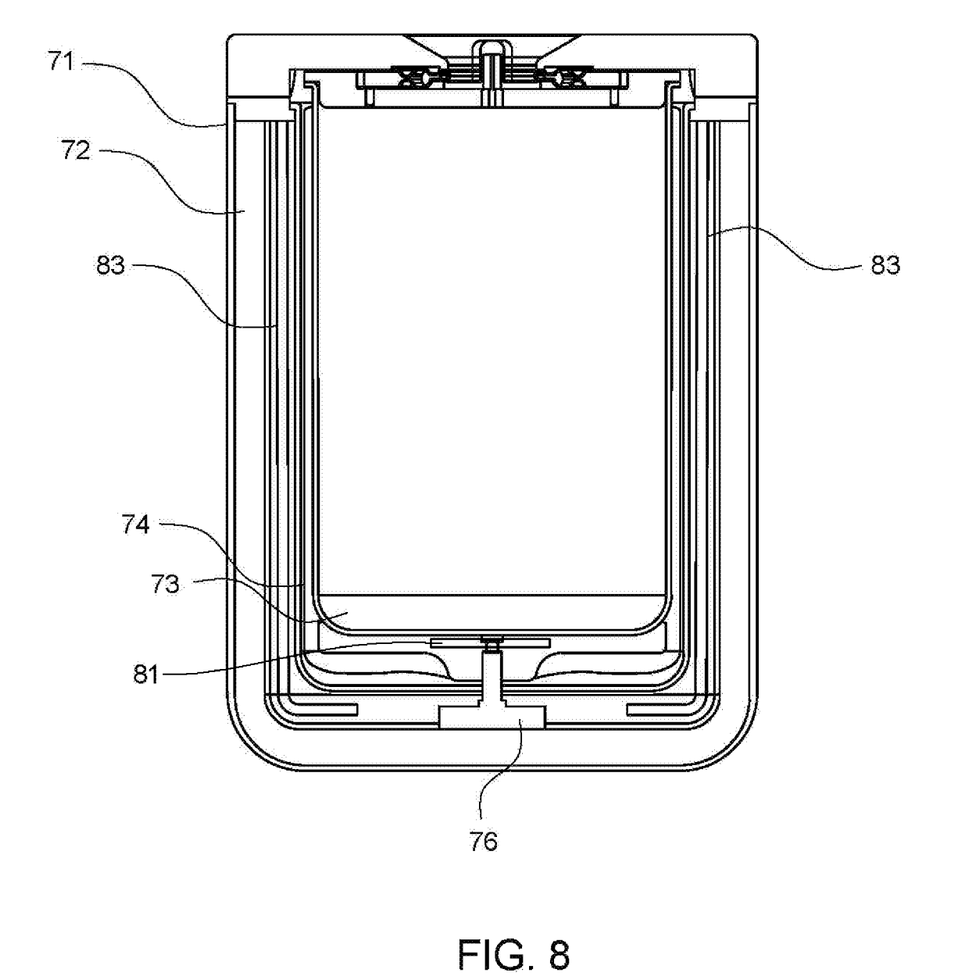
FIG. 8 is a cross-sectional view of the roller cooker of FIG. 7.

The cooking chamber 52 can include an outer housing 71 having an insulation layer 72 disposed therein. The outer housing 71 and insulation layer 72 may be permanently attached together and may be formed in a cup shape with an open top 82. An inner safety shield 74 may fit inside the insulation layer 72. The inner cooking chamber 73 can removably fit inside the inner safety shield 74.

In some embodiments, the inner safety shield 74 may provide separation between a heating element 83 and the inner cooking chamber 73. The heating element 83 may take various forms and may extend along a length of the inner safety shield 74 at one or more portions about its outer periphery. The inner safety shield 74 may be formed from a metal material that may diffuse the heat from the heating element 83, thereby providing an even heating of the inner cooking chamber 73. The heating element 83 may take various forms, such as a heated coil, heated air, an induction-based heating system, or the like.

An inner vessel spin pad 75 may be disposed at the closed end 84 of the inner cooking chamber 73. A barrel motor 76 may operate to turn the spin pad 75 and, therefore, the inner cooking chamber 73. The speed of the barrel motor 76 may be varied, as discussed in greater detail below.

An outer ring may fit over the outer housing 71 and insulation layer 72 to provide a lip to the opening 82. An inner rotating lid 79 can fit over the inner cooking chamber 73 and may rotate along with the rotation of the inner cooking chamber 73. The pivoting lid 54 may fit over the entire cooking chamber 52 to provide a non-rotating (during operation) outer lid. A turntable 80 may provide an interconnection between the pivoting lid 54 and the inner rotating lid 79 so that the inner rotating lid 79 may rotate relative to the pivoting lid 54. A steam vent 78 may provide fluid communication between the inside of the inner cooking chamber 73 and the outside of the rotating cooker 50. The steam vent may readily remove steam from the inner cooking chamber 73 to permit food to cook more via grilling rather than steaming.

Figure 9:
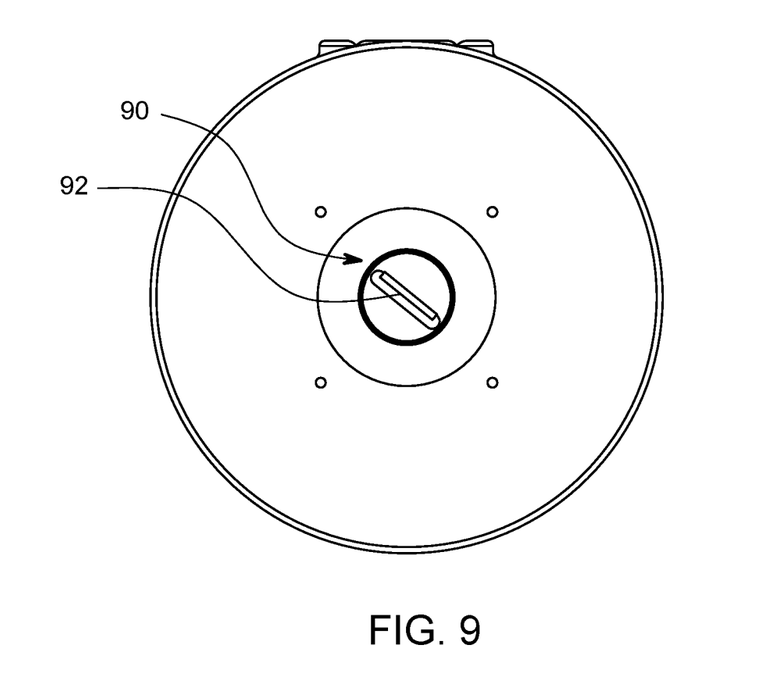
FIG. 9 is a top view of a roller cooker illustrating an exemplary steam vent mechanism in a closed configuration.
Figure 10:
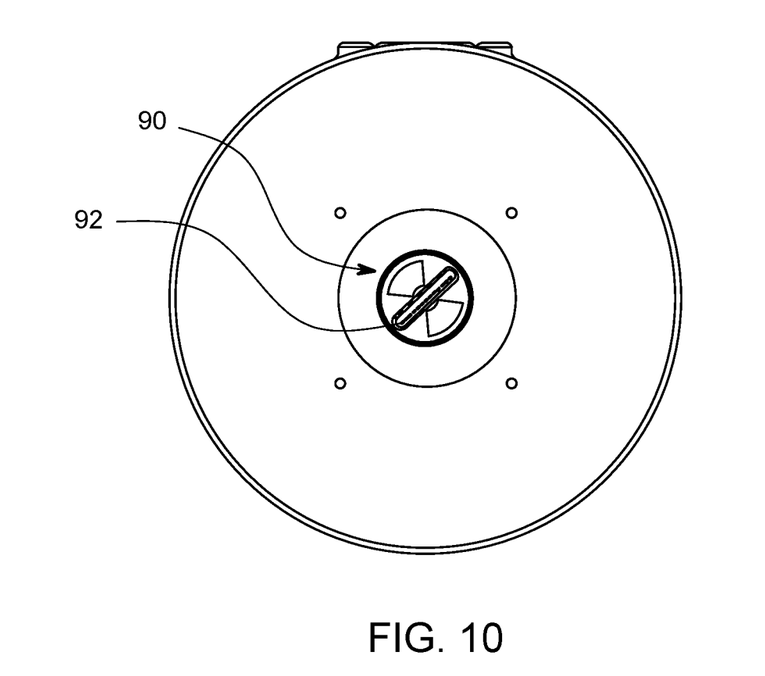
FIG. 10 is a top view of the roller cooker of FIG. 9 illustrating the steam vent mechanism in an open configuration.

Referring to FIGS. 9 and 10, an example of a steam vent 90 in a closed configuration (FIG. 9) and an open configuration (FIG. 10) are shown. In this embodiment, a user may turn a handle 92 of the steam vent 90 to adjust how much steam is retained inside the inner cooking chamber. In some embodiments, the steam vent 90 is designed to allow steam to escape to avoid pressure build-up inside the inner cooking chamber. For example, the steam vent 90 may be designed to avoid any pressure greater than 10 psi, typically below 5 psi, often below 2 psi, inside the inner cooking chamber.

Figure 11:
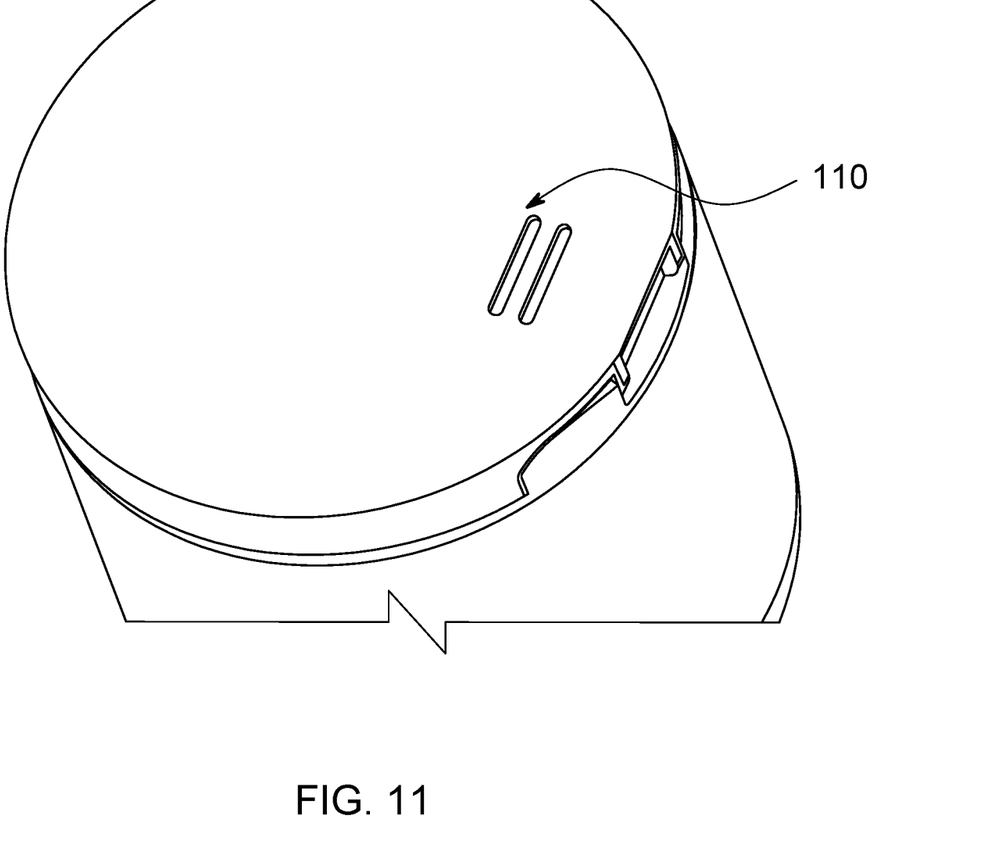
FIG. 11 is a top perspective view of a roller cooker illustrating an exemplary steam vent mechanism.
Figure 12:
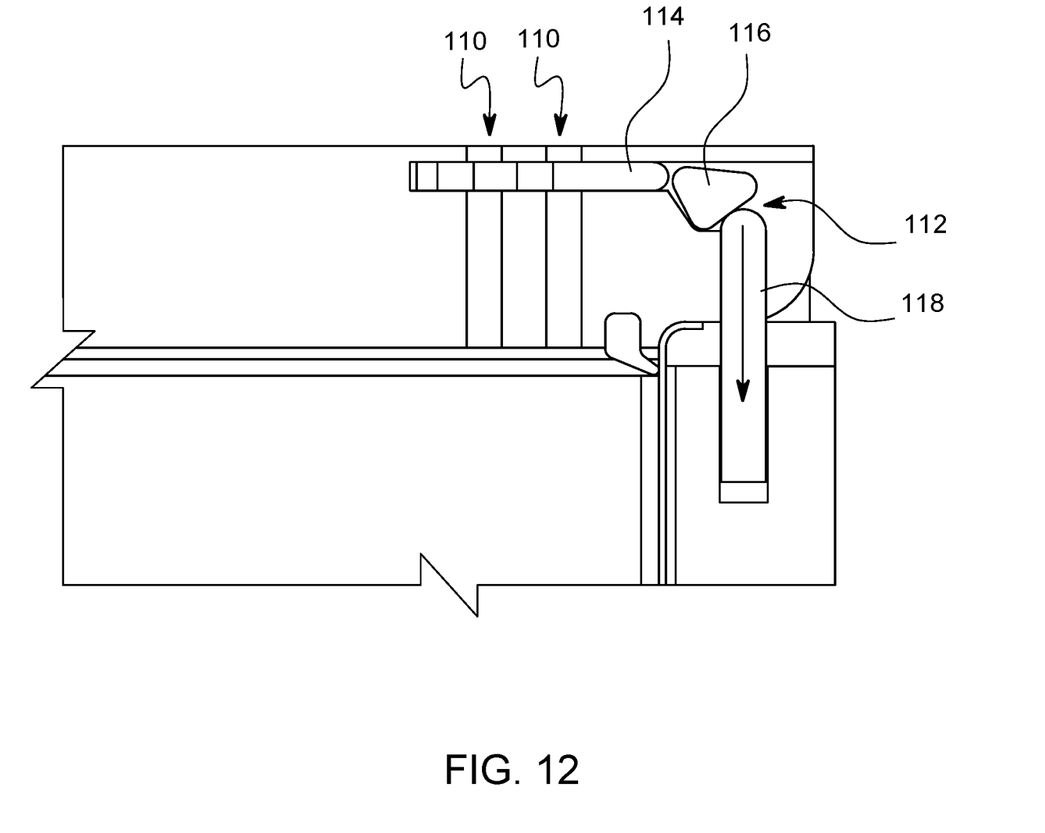
FIG. 12 is a cross-sectional view of the stem vent mechanism of FIG. 11 in a nearly completely closed configuration.
Figure 13:
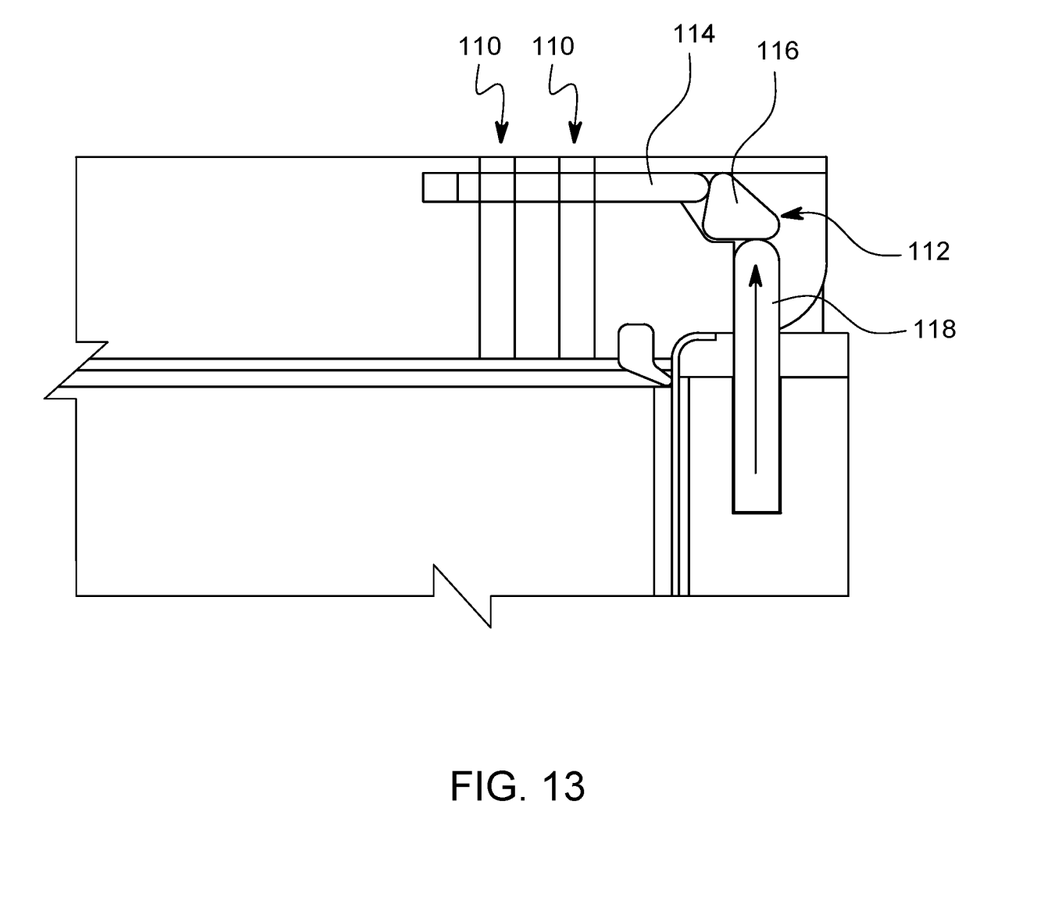
FIG. 13 is a cross-sectional view of the steam vent mechanism of FIG. 11 in an open configuration.

Referring to FIGS. 11 through 13, in some embodiments, a steam vent 110 may include a sliding linkage system 112 to open and close the steam vent 110. The sliding linkage system 112 can include a movable vent cover 114 that can be moved between a closed position (FIG. 12) and an open position (FIG. 13) via movement of an arm 118 connected to the vent cover 114 via a linkage 116.

In some embodiments, a fan (not shown) may be disposed to move air inside the inner cooking chamber 73. The fan may also be used to draw air from outside the inner cooking chamber 73 into the cooking chamber to force steam outward through the steam vents.

Figure 14A:
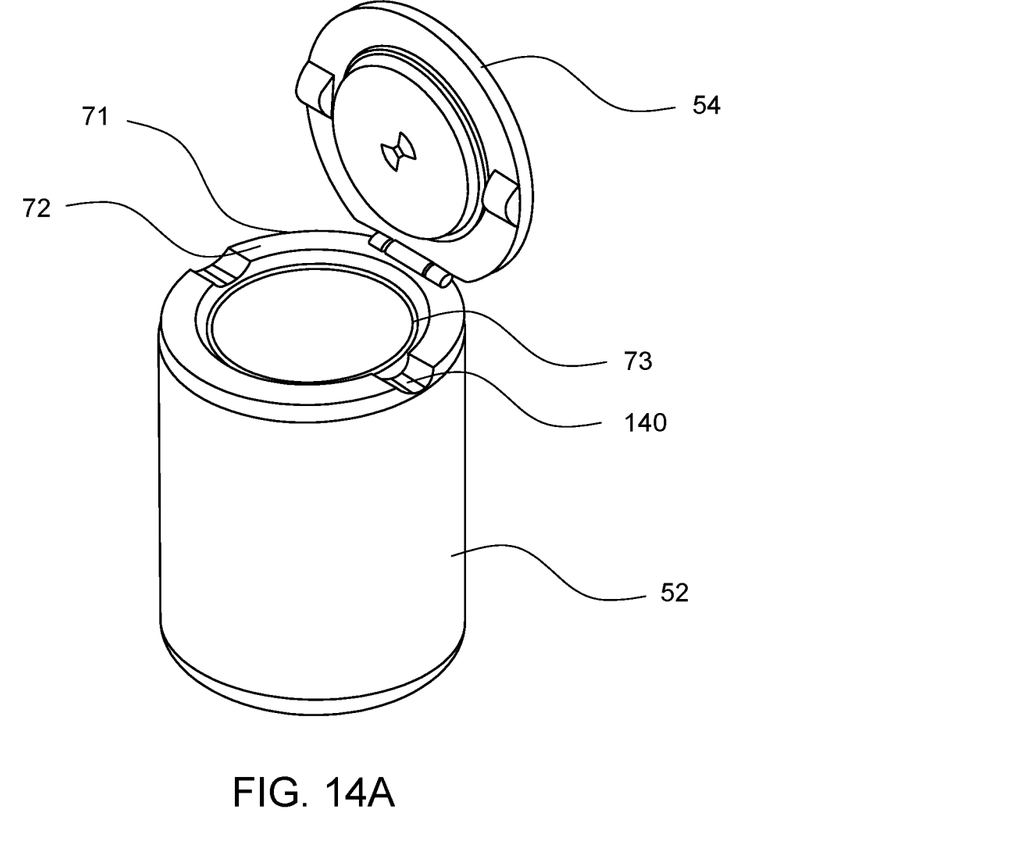
FIG. 14A is a view of a roller cooker having a removable inner cooking chamber.
Figure 14B:
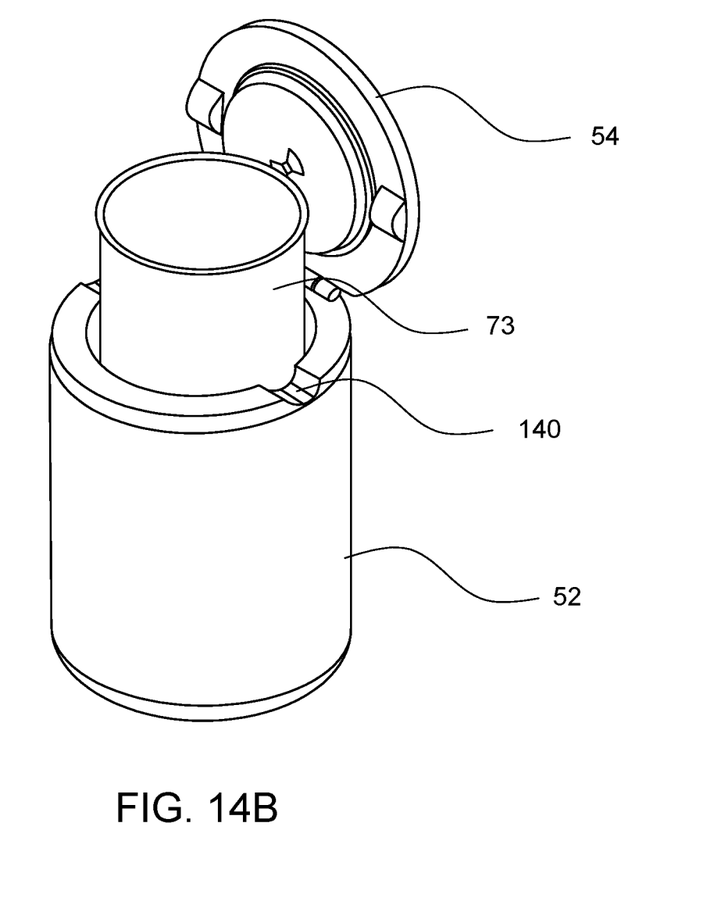
FIG. 14B is a view of the roller cooker of FIG. 14A, illustrating removal of the inner cooking chamber.

FIGS. 14A and 14B show how the inner cooking chamber 73 may be removed from the cooking chamber 52. In some embodiments, finger slots 140 may be disposed on one or more locations of the insulation layer 72 and the outer housing 71 to permit the user to directly contact the inner cooking chamber 73 when the lid 54 is opened.

Referring back to FIGS. 5 and 6, the roller cooker 50 may include a processor 51 and memory 53 for use in programming the cooker or running a preset cooking method. During cooking, there are several variables that may be used depending on the type of food, the user preferences, and the like. These variables include the cooking temperature, the rotation speed, the angle of tilt of the inner cooking chamber, ventilation of the inner cooking chamber, and the like. A control panel 60 may be disposed on one of the legs 56, as shown, or may be disposed on the cooking chamber 52, on both legs 56, or the like. The control panel 60 may include one or more displays 61-64 which may show, for example, a cooking temperature (as shown at 61), a touch screen/push button panel for temperature adjustment (as shown at 62), a rotation speed display (as shown at 63) and a touch screen/ push button panel for speed adjustment (as shown at 64). Push buttons 65-68 may be used to toggle the displays 61-64. For example, pressing button 65 may change the temperature display into a cooking angle display, where adjustment of the cooking angle can cause an angle adjust motor 55 to move the cooking chamber 52 and adjust the cooking angle. The push buttons 65-68 may also be used for selecting a pre-programmed cooking sequence or may be used to program and/or save a custom cooking sequence. For example, a user can program a vegetable cooking sequence that include a first temperature for 10 minutes, with faster rotation, then a second temperature for 20 minutes, with a slower rotation. Moreover, the user can choose to ventilate the inner cooking chamber, as discussed below, for the first 5 minutes, then minimize ventilation for the remainder of the cooking time. In some embodiments, the roller cooker 50 can include a wireless communication interface that permits a user to control the various functions of the roller cooker 50 via a separate computing device, such as a smart phone, connected to the roller cooker 50 via the wireless communication interface. Software may be provided to a user to program the cooking steps, including angle of tilt, time, temperature, rolling speed and the like.

The roller cooker 50 can further include a push button 69 for opening the lid for access to food. In some embodiments, the programming sequence discussed above can allow for automatic opening of the lid after a cooking sequence is complete. This may be useful to vent steam away from the food after cooking, for example.

The ventilation program may be used to either automatically adjust the steam vents, as discussed above. In some embodiments, a ventilation fan 81 (see FIG. 8) may be disposed adjacent the bottom of the inner cooking chamber 73 to allow air to enter the inner cooking chamber 73 and out the steam vent. Typically, the ventilation fan 81 is useful when the inner cooking chamber 73 is a slotted chamber. An air intake (not shown) may be configured to provide air from outside the roller cooker to the ventilation fan 81.

In some embodiments, the device can have an option/ configuration to operate with a communications module that would allow users to interact thru the could via wireless communication, such as Wi-Fi, Bluetooth, mobile app or the like. This would allow the device to interact with other smart home systems. As an example, a user could load the cooking device with food and ingredients, then could remotely interact with the device. By transacting data, for example, from the device to a cloud-based storage, data can be collected regarding frequency of use, time of use, cooking cycle, and the like. This information could be valuable. An example is the cooling device is making Risotto with 14 hour cooking cycle. If the serving time is delayed, the user can interact with a mobile app to adjust cycle time.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

Many alterations and modifications may be made by those having ordinary skill in the art without departing from the spirit and scope of the invention. Therefore, it must be understood that the illustrated embodiments have been set forth only for the purposes of examples and that they should not be taken as limiting the invention as defined by the following claims. For example, notwithstanding the fact that the elements of a claim are set forth below in a certain combination, it must be expressly understood that the invention includes other combinations of fewer, more or different ones of the disclosed elements.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what incorporates the essential idea of the invention.

What is claimed is:

1. A device for cooking a food product comprising:
an inner cooking chamber having at least one open end;
a cap removably placeable on the at least one open end;
an outer housing receiving the inner cooking chamber therein;
a motor operable to rotate the inner cooking chamber relative to the outer housing;
a lid disposed over the open end of the inner cooking chamber;
a heating element disposed adjacent to the inner cooking chamber;

at least one leg support pivotally supporting the outer housing configured to set the angle of the outer housing;
a processor configured to control the rotation of the inner chamber and the tilt of the outer housing;
a control panel interfaced to the processor, configured to accept user input and to control a plurality of parameters for the cooking device, wherein the plurality of parameters includes at least one of a cooking temperature, a cooking time, outer housing angle, and a rotation speed of the inner cooking chamber; and
a wireless communication interface that permits a user to control the plurality of parameters of the device via a separate computing device connected to the device via the wireless communication interface.

2. The device of claim 1, further comprising an insulation layer disposed between the outer housing and the inner cooking chamber.

3. The device of claim 1, further comprising an inner safety shield disposed between the inner cooking chamber and the outer housing.

4. The device of claim 1, further comprising a ventilation fan disposed at a bottom side of the inner cooking chamber, the ventilation fan operable to deliver air into the inner cooking chamber and out of the inner cooking chamber via one or more vents.

5. The device of claim 1, further comprising a lid opening button operable to open the lid.

6. The device of claim 1 further comprising at least one of steam vent or a lid opener configured to provide at least one of access or ventilation to the inner cooking chamber.

7. The device of claim 1, wherein at least one of the steam vent or opening lid is controllable by a processor and is actuated by at least one of cooking time, internal pressure, programmed cooking sequence, or user input from at least one of the control panel or a wireless communication interface.

8. A device for cooking a food product comprising:
an inner cooking chamber having at least one open end;
a cap removably placeable on the at least one open end;
an outer housing receiving the inner cooking chamber therein;
a motor operable to turn the inner cooking chamber relative to the outer housing;
a lid disposed over the open end of the inner cooking chamber;
at least one leg extending from a base, the at least one leg pivotally supporting the outer housing and configured to set an angle of the outer housing;
a heating element disposed adjacent to the inner cooking chamber;
a processor configured to control the rotation of the inner chamber and the tilt of the outer housing; and
a control panel interfaced to the processor, configured to accept user input and to control a plurality of parameters for the cooking device, wherein the plurality of parameters includes at least one of a cooking temperature, a cooking time, outer housing angle, the tilt of the outer housing and a rotation speed of the inner cooking chamber.

9. The device of claim 8, further comprising a control panel permitting the user to select a plurality of parameters for the cooking device.

10. The device of claim 9, wherein the plurality of parameters includes at least one of a cooking temperature, a cooking time and a rotation speed of the inner cooking chamber.

11. The device of claim 9, wherein the plurality of parameters includes a cooking temperature, a cooking time and a rotation speed of the inner cooking chamber.

12. The device of claim 9, wherein the plurality of parameters includes a cooking temperature, a cooking time, a rotation speed of the inner cooking chamber and an angle of the inner cooking chamber.

13. The device of claim 8, further comprising a ventilation fan disposed at a bottom side of the inner cooking chamber, the ventilation fan operable to deliver air into the inner cooking chamber and out of the inner cooking chamber via one or more vents.

14. A device for cooking a food product comprising:
an inner cooking chamber having at least one open end;
a cap removably placeable on the at least one open end;
an outer housing receiving the inner cooking chamber therein;
a motor operable to turn the inner cooking chamber relative to the outer housing;
a lid disposed over the open end of the inner cooking chamber;
an insulation layer disposed between the outer housing and the inner cooking chamber;
an inner safety shield disposed between the inner cooking chamber and the outer housing;
a heating element disposed adjacent to the inner cooking chamber;
at least one leg extending from a base, the at least one leg pivotally supporting the outer housing and configured to set an angle of the outer housing;
a processor configured to control the rotation of the inner chamber and the tilt of the outer housing; and
a control panel permitting the user to select a plurality of parameters for the cooking device wherein the plurality of parameters includes a cooking temperature, a cooking time, the tilt of the outer housing and a rotation speed of the inner cooking chamber, wherein
the inner cooking chamber is pivotable, relative to the base.

15. The device of claim 14, further comprising a ventilation fan disposed at a bottom side of the inner cooking chamber, the ventilation fan operable to deliver air into the inner cooking chamber and out of the inner cooking chamber via one or more vents.

* * * * *